UNITED STATES PATENT OFFICE.

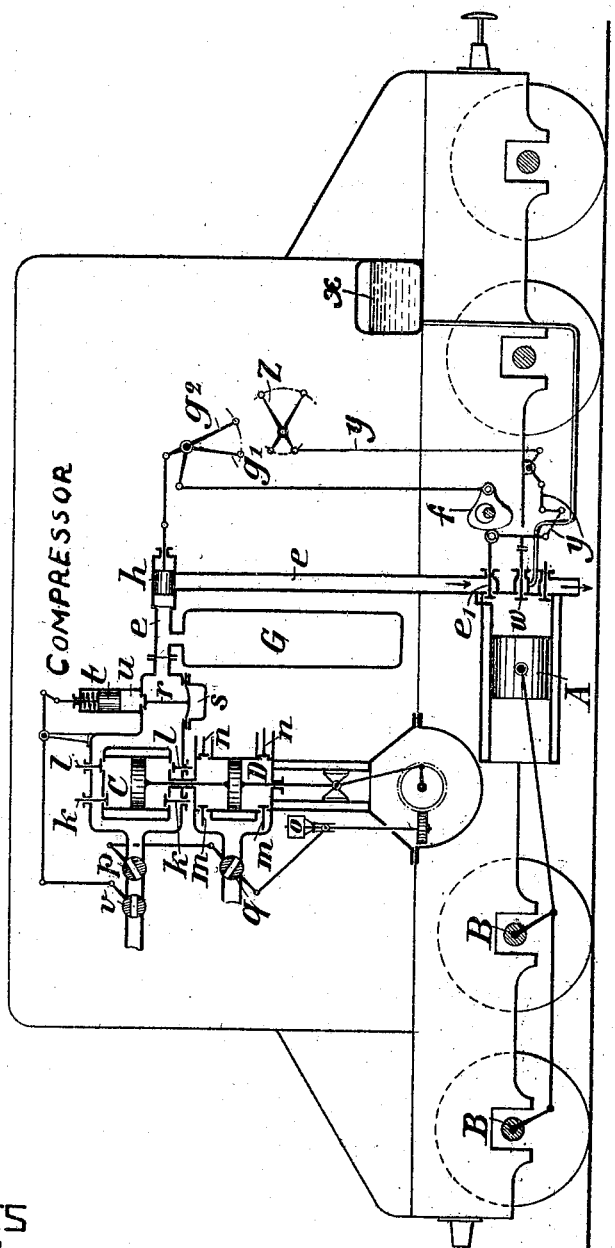

THEODOR REUTER, OF WINTERTHUR, SWITZERLAND.

MOTOR ARRANGEMENT FOR VEHICLES OF ALL KINDS.

1,046,331. Specification of Letters Patent. Patented Dec. 3, 1912.

Application filed August 31, 1910. Serial No. 579,929.

*To all whom it may concern:*

Be it known that I, THEODOR REUTER, engineer, a citizen of the Swiss Republic, residing at 24 Obers Wielandstrasse, Winterthur, Switzerland, have invented certain new and useful Improvements in Motor Arrangements for Vehicles of All Kinds; and I do hereby declare the following to be a full, clear, and exact description of the invention, such as will enable others skilled in the art to which it appertains to make and use the same.

This invention relates to a motor arrangement for all kinds of vehicles (locomotives, road vehicles, airships or marine vessels) having two motors or engines, one of which works independently of the driving axles, as an auxiliary motor, and is used for supplying compressed air to the main driving engine, which is an internal combustion engine and is coupled to the driving axles.

A construction according to this invention is diagrammatically illustrated in the accompanying drawing, applied to a locomotive.
A is a two-cycle internal combustion engine coupled direct to the driving axles B, and D is a second internal combustion engine working independently of the driving axles and connected to a compressor C which supplies the required compressed air to the engine. Fuel is supplied from the tank $x$ to the latter engine by any suitable means such as valve $n$ operated by the cam $f$ and controlled from the operator's platform by means of the control lever $z$ through the intermediary of the bell-crank levers $y$. A pipe $e$ leads from the compressor C to the mixing chamber of the engine A, and to store up any excess of compressed air, a reservoir G may be connected to the pipe $e$. The driving engine can of course be coupled to the driving axles indirectly, for instance, by making it drive a separate shaft which is connected to the driving axles. Instead of one driving engine or of one auxiliary engine, several may be used.

On the driving engine, the air inlet valve $e'$ is controlled in the well known manner to drive the engine forward or backward by a valve gear $f$ and reverse is effected from the driver's platform by means of a lever $g'$. The change in the air supply to the engine is effected by means of a valve $h$ which is also regulated from the driver's platform by means of a lever $g^2$.

On the air compressing apparatus C are mounted the air inlet ports $k$ and the outlets $l$; the auxiliary engine D having inlet ports $m$ and the outlets $n$. A governor $o$ controls the position of the valves $p$ and $q$ which regulate the admission of air to the compressor and auxiliary engine. The compressed air escaping into the compressed air pipe $e$ opens a valve $r$ as soon as the pressure of the air reaches a certain value. A piston $t$ moves under the influence of the compressed air and by means of suitable transmission gear actuates a regulating valve $v$ thus controlling the amount of air admitted to the compressor independently of the main regulating valve $p$. If, owing to the decrease of the consumption of air by the driving engine, the pressure of the compressed air exceeds a predetermined maximum value, the valve $r$ is opened and the piston $t$ in being operated by the compressed air and acting on the regulating valve $v$ tends to close the air inlet. The valve $r$ remains closed until the maximum pressure is reached, the regulating valve $v$ being fully open and admission of air being controlled only by the main regulating valves $p$ and $q$. The two regulating valves $p$ and $q$ act in opposition to each other, as indicated in the drawing, so that when air is admitted to the inlet ports $m$ of the auxiliary engine, the passages to the inlet ports $k$ of the air compressor are closed. At the same time the arrangement is such that when the regulating valve $q$ is closed, the valve $p$ does not yet influence the inlet ports $k$, and conversely, when the regulating valve $p$ is closed, the valve $q$ does not yet influence the inlet ports $m$.

The governor $o$ has no tendency to become operative within the normal speed zone or limit of the auxiliary engine. Within that zone, when the inlet for the auxiliary engine is fully open, regulation of the air supply to the air compressor, takes place in such a manner that as the pressure of the compressed air increases, the effective power absorbed by the compressor becomes greater than the power supplied by the auxiliary engine, and consequently the number of revolutions of the auxiliary engine begins to sink, while conversely, when the pressure of the compressed air in the pipes $e$ decreases, the effective power absorbed by the compressor is greater than that corresponding to the effective compressor work, and consequently the number of revolutions of the auxiliary engine will increase. This increase and decrease in the number of revolutions take place while the regulating valves $p$ $q$ and $v$ are stationary, and constantly recurs during normal working. Only when the maximum number of revolutions is exceeded, or sinks below a minimum does the governor $o$ begin to affect the position of the regulating valves $p$ and $q$.

If it is assumed that the vehicle is traveling over a long downward slope, then, owing to the arrangement of the main engine, the consumption of compressed air per unit of time will sink to zero, consequently during further supply by the air compressor, the pressure of the compressed air in the pipe $e$ will rise to the maximum value determined by the adjustment of the valve $r$. With the increase in the pressure of the compressed air a corresponding decrease in the number of revolutions of the auxiliary engine first of all takes place. The governor $o$ shifts the regulating valve $p$ for the air inlet, so that the effective air supply per revolution will become smaller, while the effective compressor work will remain the same. The decreasing air supply, while the work of the auxiliary engine remains the same, entails a corresponding increase in the pressure of the compressed air, the maximum value of which is to be limited by the action of the valve $r$.

On the valve $r$ being opened, the air inlet $v$ for the air compressor is closed, the compressor work will therefore cease doing work (i. e. runs idle) which results in an increase in the number of revolutions of the auxiliary engine beyond the predetermined maximum. As soon as this maximum number of revolutions is exceeded, the governor $o$ will again move the regulating valves $p$ and $q$, but in the opposite direction. The valve $p$ remains inoperative as the valve $v$ is still closed, but the valve $q$ throttles the inlet for the auxiliary engine so that the latter has only sufficient power to run idle. This happens when the vehicle is stationary. If, on the contrary, it is assumed that the car is driven from rest on the level or up an incline, the increasing compressed air consumption will rapidly cause the pressure of air to fall. The valve $r$ will be closed, the piston $t$ returns to its original position and thus opens the regulating valve $v$ to its full extent. The auxiliary engine when running idle worked at a maximum number of revolutions, that is to say, with the regulating valve $p$ fully open, and the regulating valve $q$ nearly closed, the air compressing device will therefore at once produce the maximum effective air supply; the work of the compressor will first produce the full opening of the valve $q$ thus decreasing the number of revolutions and with the open regulating valves $p$ $q$ $v$ will adjust the number of revolutions corresponding to the compressed air pressure in the pipe $e$, in accordance with the consumption of air by the driving engine.

The characteristic feature of the regulation according to this invention is therefore that the normal fluctuations in the compressed air supply can be taken up without operating the main regulating valves to affect the number of revolutions; that the compressor work changes with the compressed air pressure, while the effective work of the auxiliary engine remains the same; further, that the passage from one method of working to the other takes place in the most varied conditions of air supply and air consumption without necessitating the manual operation of any valve gear for the auxiliary engine and the air compressor.

What I claim is:

1. The combination of a main engine, an auxiliary engine, an air compressor operated by the latter and connected to the former, and regulating mechanism which controls the supply of air to the compressor in accordance with the pressure of air fed to the main engine, and which varies the air supply to the compressor and auxiliary engine in accordance with the speed of the latter.

2. The combination of a main engine, an auxiliary engine, an air compressor driven by the auxiliary engine and connected with the main engine to feed the same, a pressure responsive regulating device to control automatically the supply of air to the compressor, and a speed responsive regulating device to control the supply of air to the compressor and regulate the speed of the auxiliary engine.

3. The combination of a main engine, an auxiliary engine, an air compressor driven by the auxiliary engine and connected with the main engine to supply the same with air, a pressure responsive regulating device to control automatically the supply of air to the compressor, and a speed responsive regulating device to control the supply of air to both the compressor and auxiliary engine in consonance with the speed of the latter.

4. The combination of a main driving engine, an auxiliary engine, an air compressor driven by the latter and connected to the former to supply it with air, and regulating mechanism which decreases the air supply to the compressor when the speed of the auxiliary engine decreases beyond a certain limit, cuts off said supply entirely as a predetermined pressure limit is reached in the supply to the main engine, and throttles the auxiliary engine when the same runs idle.

5. The combination of a main driving engine, an auxiliary engine, an air compressor driven by the latter and connected to the former to supply it with air, a regulating device responsive to the speed of the auxiliary engine, which decreases the air supply to the compressor when said engine attains a certain speed, and throttles said auxiliary engine when the same runs idle, and a pressure responsive regulating device to cut off completely the air supply to the compressor when the pressure supply to the main engine increases beyond a predetermined limit.

6. The combination of a main driving engine, an auxiliary engine, an air compressor driven by the latter and connected to the former to supply it with air, a pressure responsive regulating device to permit a full air supply to the compressor under normal and abnormal low pressures of the air supply to the main engine, and a speed responsive regulating device in connection with the auxiliary engine, which acts in conjunction with said first-named regulating device and increases the air supply to the auxiliary engine as the load on the same increases.

7. The combination of a main driving engine, an auxiliary engine, an air compressor driven by the latter and connected with the driving engine to supply the same with air, and a governor operated by the auxiliary engine and operative to throttle the air supply to the compressor and the air supply to said auxiliary engine.

8. The combination of a driving engine, an auxiliary engine, an air compressor operated by the latter and connected with the former to supply the same with air, means automatically controlled by the air pressure intermediate said compressor and driving engine, to control the admission of air to the compressor, and a governor operated by the auxiliary engine and coacting with said controlling means to regulate the relative amounts of air fed to the auxiliary engine and the compressor respectively, under different conditions.

9. The combination of a main engine, an auxiliary engine, an air compressor operated by the latter and connected with the former, a valve responsive to pressure intermediate the main engine and compressor, and controlling the air supply to the latter, a governor operated by the auxiliary engine, and a second valve to control the air supply to said compressor, acting in conjunction with said first valve and controlled by said governor.

10. The combination of a main engine, an auxiliary engine, an air compressor operated by the latter and connected with the former, a valve responsive to pressure intermediate the main engine and compressor, and controlling the air supply to the latter, a governor operated by the auxiliary engine, a second valve to control the air supply to said compressor, acting in conjunction with said first valve and controlled by said governor, and an air supply valve for the auxiliary engine, also controlled by said governor.

11. In power installations for vehicles and the like, a main internal combustion engine, an auxiliary internal combustion engine, an air compressor operated by the auxiliary engine and connected with said main engine to supply the same with air, a valve to control air admission to said compressor, a valve to control air admission to said auxiliary engine, and a governor operated by the auxiliary engine and connected with said valves to operate them differentially, as described.

12. In a power installation for vehicles and the like, a main internal combustion driving engine, an auxiliary internal combustion engine, an air compressor driven by the latter and connected to the former to supply the same with air, valves to control the admission of air to the compressor and auxiliary engine inlets respectively, and a governor driven by the auxiliary engine and operatively connected with said valves.

13. The combination of a main engine, an auxiliary internal combustion engine having air inlets, a compressor operated by said auxiliary engine and having air inlets, said compressor being connected to the main engine to supply the same with air, and automatic regulating mechanism which adjusts the air inlets of the auxiliary engine when a predetermined speed is exceeded and adjusts the air inlets of the compressor when the speed decreases beyond a predetermined lower limit.

In testimony whereof I have affixed my signature, in presence of two witnesses.

THEODOR REUTER.

Witnesses:
WILHELM BACHMANN,
AUGUST MARKLIN.